(12) United States Patent
Tanaka et al.

(10) Patent No.: US 10,676,577 B2
(45) Date of Patent: Jun. 9, 2020

(54) GLASS-FIBER-REINFORCED POLYAMIDE RESIN COMPOSITION

(71) Applicant: TOYOBO CO., LTD., Osaka (JP)

(72) Inventors: Kazunari Tanaka, Shiga (JP); Shuji Kubota, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 155 days.

(21) Appl. No.: 15/779,626

(22) PCT Filed: Nov. 29, 2016

(86) PCT No.: PCT/JP2016/085278
§ 371 (c)(1),
(2) Date: May 29, 2018

(87) PCT Pub. No.: WO2017/094696
PCT Pub. Date: Jun. 8, 2017

(65) Prior Publication Data
US 2018/0371185 A1 Dec. 27, 2018

(30) Foreign Application Priority Data

Dec. 2, 2015 (JP) .................................. 2015-235414

(51) Int. Cl.
| | | |
|---|---|---|
| *C08J 5/00* | (2006.01) | |
| *C08L 33/08* | (2006.01) | |
| *C08K 3/34* | (2006.01) | |
| *C08K 3/04* | (2006.01) | |
| *C08K 7/14* | (2006.01) | |
| *C08J 5/04* | (2006.01) | |
| *C08L 77/02* | (2006.01) | |
| *C08L 77/06* | (2006.01) | |

(52) U.S. Cl.
CPC .............. *C08J 5/005* (2013.01); *C08J 5/043* (2013.01); *C08K 3/04* (2013.01); *C08K 3/34* (2013.01); *C08K 7/14* (2013.01); *C08L 33/08* (2013.01); *C08L 77/02* (2013.01); *C08L 77/06* (2013.01); *C08J 2367/02* (2013.01); *C08J 2377/02* (2013.01); *C08J 2377/06* (2013.01); *C08J 2433/12* (2013.01); *C08J 2477/06* (2013.01); *C08L 2205/025* (2013.01); *C08L 2205/03* (2013.01)

(58) Field of Classification Search
CPC ..... C08K 3/34; C08K 3/04; C08K 7/14; C08J 5/043; C08J 5/005; C08J 2477/06; C08J 2377/02; C08J 2377/06; C08J 2433/12; C08J 2367/02; C08L 77/02; C08L 77/06; C08L 33/08; C08L 2205/03; C08L 2205/025
USPC ......................................................... 524/449
See application file for complete search history.

(56) References Cited

U.S. PATENT DOCUMENTS

| | | | |
|---|---|---|---|
| 5,412,013 | A | 5/1995 | Watanabe |
| 6,534,583 | B1 | 3/2003 | Tamura |
| 6,855,755 | B1 | 2/2005 | Morimoto et al. |
| 2003/0153677 | A1 | 8/2003 | Warth et al. |
| 2011/0155948 | A1* | 6/2011 | Namkung ............... C08L 77/00 252/74 |
| 2015/0175804 | A1 | 6/2015 | Aepli |

FOREIGN PATENT DOCUMENTS

| | | |
|---|---|---|
| JP | 5-105812 | 4/1993 |
| JP | 6-32981 | 2/1994 |
| JP | 8-92465 | 4/1996 |
| JP | 2000-273299 | 10/2000 |
| JP | 2001-98149 | 4/2001 |
| JP | 2001-106902 | 4/2001 |
| JP | 2002-284990 | 10/2002 |
| JP | 3442502 | 9/2003 |
| JP | 2003-534433 | 11/2003 |
| JP | 2010-189467 | 9/2010 |
| JP | 2015-120908 | 7/2015 |
| WO | 2006/003973 | 1/2006 |

OTHER PUBLICATIONS

International Search Report dated Feb. 28, 2017 in International Application No. PCT/JP2016/085278.
International Preliminary Report on Patentability dated Jun. 14, 2018 in International Application No. PCT/JP2016/085278.

* cited by examiner

*Primary Examiner* — Angela C Scott
(74) *Attorney, Agent, or Firm* — Wenderoth, Lind & Ponack, L.L.P.

(57) ABSTRACT

The present invention is a glass-fiber-reinforced polyamide resin composition which contains a crystalline aliphatic polyamide resin (A), an amorphous polyamide resin (B), an acrylic resin (C), mica (D), glass fiber (E) and carbon black (F) in a ratio by mass of (10 to 40):(2 to 20):(1 to 10):(2 to 25):(20 to 50):(0.1 to 5), respectively and further contains a copper compound (G) in a rate of 0.005 to 1.0 part by mass when a total amount of the ingredients (A) to (F) is taken as 100 parts by mass.

5 Claims, No Drawings

GLASS-FIBER-REINFORCED POLYAMIDE RESIN COMPOSITION

TECHNICAL FIELD OF THE INVENTION

The present invention relates to a glass-fiber-reinforced polyamide resin composition being excellent in an appearance of a molded product thereof and in a weather resistance, and particularly showing little fading in terms of its black color and showing no filler mark such as glass fiber mark even under an outside condition, especially even under a use condition of being exposed to a rainfall.

BACKGROUND ART

A polyamide resin is excellent in a mechanical characteristic, a thermal property and a resistance to chemicals. Accordingly, it has been widely used as parts for automobiles, electric/electronic products, etc. In addition, a reinforced polyamide resin composition wherein polyamide is compounded with glass fiber exhibits a greatly improved mechanical characteristic, a greatly improved thermal property and a greatly improved resistance to chemicals. Therefore, investigations using the reinforced polyamide resin composition as a substitute material for metal have become brisk in view of a weight reduction, a rationalization of steps, etc.

Although a reinforced polyamide resin compounded with high concentrations of glass fiber, wollastonite, etc. can easily provide a molded product having a high rigidity, it is inferior in a weather resistance. Accordingly, an improvement is needed for using it outside. As to a method for improving the weather resistance, there have been proposals such as Patent Documents 1, 2 and 3.

In Patent Document 1, there is proposed a resin composition wherein poly-m-xylylene adipamide is compounded with an acrylic resin and an epoxy group-containing compound. In this resin composition, the epoxy group-containing compound is essential. Accordingly, a gel-like substance occurs or a melt fluidity lowers when a retention happens during a molding whereby an appearance of a molded product is deteriorated. In addition, a weather resistance is also insufficient. In Patent Document 2, there is proposed a resin composition comprising crystalline semi-aromatic polyamide as a main ingredient and further comprising glass fiber, wollastonite, carbon black and a copper compound. This resin composition has several deficiencies in terms of its production. Specifically, it is necessary to adopt a high molding resin temperature because the semi-aromatic polyamide is used as a main ingredient. In addition, a problem of abrasion of screw is unavoidable because wollastonite is compounded. When mica is compounded in place of wollastonite, it is impossible to sufficiently improve a weather resistance and to sufficiently prevent a fading in black color after exposure to a bad weather. Accordingly, there is yet a room for further improvements. In Patent Document 3, there is proposed a resin composition comprising a crystalline semi-aromatic polyamide as a main ingredient and further comprising glass fiber, wollastonite, specific carbon black and a copper compound. However, this resin composition has also the same deficiencies as those in Patent Document 2. In addition, it is necessary to use the specific carbon black. Further, when aliphatic polyamide is used as a main ingredient, it is impossible to sufficiently improve a weather resistance and to sufficiently prevent a fading in black color after exposure to a bad weather. Accordingly, there is yet a room for further improvements.

PRIOR ART DOCUMENTS

Patent Documents

Patent Document 1: Japanese Patent No. 3442502
Patent Document 2: Japanese Patent Application Laid-Open (JP-A) No. 2000-273299
Patent Document 3: Japanese Patent Application Laid-Open (JP-A) No. 2002-284990

DISCLOSURE OF THE INVENTION

Problem that the Invention is to Solve

The present invention has been created in view of a current status of the above-mentioned prior art. An object of the present invention is to provide a glass-fiber-reinforced polyamide resin composition being excellent in an appearance of a molded product thereof and in a weather resistance, and particularly showing little fading in terms of its black color and showing no filler mark such as glass fiber mark even under an outside condition, especially even under a use condition of being exposed to a rainfall.

Means for Solving the Problem

The inventors have conducted eager investigations for achieving the object. As a result, they have found that a glass-fiber-reinforced polyamide resin composition having an excellent weather resistance can be provided when a crystalline aliphatic polyamide resin, an amorphous polyamide resin, an acrylic resin, mica, glass fiber, carbon black and a copper compound are compounded in a specific rate whereupon the present invention has been accomplished.

Thus, the present invention adopts the following constitutions.

(1) A glass-fiber-reinforced polyamide resin composition, characterized in that, the composition contains a crystalline aliphatic polyamide resin (A), an amorphous polyamide resin (B), an acrylic resin (C), mica (D), glass fiber (E) and carbon black (F) in a ratio by mass of (10 to 40):(2 to 20):(1 to 10):(2 to 25):(20 to 50):(0.1 to 5), respectively and further contains a copper compound (G) in a rate of 0.005 to 1.0 part by mass when a total amount of the ingredients (A) to (F) is taken as 100 parts by mass.

(2) The glass-fiber-reinforced polyamide resin composition according to (1), wherein the amorphous polyamide resin (B) is a semi-aromatic polyamide.

(3) The glass-fiber-reinforced polyamide resin composition according to (1) or (2), wherein, when a flat plate is prepared by subjecting the glass-fiber-reinforced polyamide resin composition to an injection molding and the resulting plate is subjected to a weathering test in accordance with JIS K 7350-2, a color difference ΔE before and after the weathering test is 3.5 or less.

(4) A molded product for vehicle interior or vehicle exterior, characterized in that, the product has been molded by using the glass-fiber-reinforced polyamide resin composition according to any of (1) to (3).

(5) The molded product for vehicle interior or vehicle exterior according to (4), wherein the product is selected from a group consisting of an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

Advantages of the Invention

The glass-fiber-reinforced polyamide resin composition of the present invention can provide a molded product having an excellent weather resistance, wherein the molded product shows little fading in terms of its black color and shows no filler mark such as glass fiber mark even under a use condition of being exposed to a rainfall.

The glass-fiber-reinforced polyamide resin composition of the present invention contains a crystalline aliphatic polyamide resin (A), an amorphous polyamide resin (B), an acrylic resin (C), mica (D), glass fiber (E) and carbon black (F) in a ratio by mass of (10 to 40):(2 to 20):(1 to 10):(2 to 25):(20 to 50):(0.1 to 5), respectively and further contains a copper compound (G) in a rate of 0.005 to 1.0 part by mass when the total amount of the ingredients (A) to (F) is taken as 100 parts by mass.

As to the crystalline aliphatic polyamide resin (A), there are exemplified a polyamide resin prepared by polycondensation of raw materials such as lactam, ω-aminocarboxylic acid, dicarboxylic acid, diamine, etc. or a copolymer, a blended product or the like thereof. As to the lactam and the ω-aminocarboxylic acid, there are exemplified ε-caprolactam, 6-aminocaproic acid, ω-enatholactam, 7-aminoheptanoic acid, 11-aminoundecanoic acid, 9-aminononanoic acid, α-pyrrolidone and α-piperidine. As to the dicarboxylic acid, there are exemplified glutaric acid, adipic acid, azelaic acid, sebacic acid and suberic acid. As to the diamine, there are exemplified tetramethylenediamine, hexamethylenediamine, octamethylenediamine, undecamethylenediamine and dodecamethylenediamine. As to specific examples of the crystalline aliphatic polyamide resin (A), polyamide 6, polyamide 12, polyamide 66, polyamide 46, polyamide 610, polyamide 612, and polyamide 1010 are preferred.

A compounding rate of the crystalline aliphatic polyamide resin (A) is 10 to 40 parts by mass and preferably 20 to 30 parts by mass when a total amount of the ingredient (A) and the ingredients (B) to (F) in the glass-fiber-reinforced polyamide resin composition of the present invention is taken as 100 parts by mass. When the compounding rate of the crystalline aliphatic polyamide resin (A) is less than the above range, there is a tendency that a melting extrusion of the composition becomes difficult. On the contrary, when it is more than the above range, there is a tendency that a mechanical characteristic, a thermal characteristic, etc. become inferior.

The amorphous polyamide resin (B) is a polyamide resin which exhibits no melt peak of crystals in a thermogram in a measurement of DSC. As to dicarboxylic acid which is a constituting ingredient, there are exemplified terephthalic acid, isophthalic acid, adipic acid and sebacic acid. As to diamine, there are exemplified tetramethylenediamine, hexamethylenediamine, m-xylylenediamine, p-xylylenediamine, undecamethylenediamine, dodecamethylenediamine, 2-methylpentamethylenediamine, trimethylhexamethylenediamine, aminoethylpiperazine and bisaminomethylcyclohexane. Among them, a semi-aromatic polyamide is preferred in order to simultaneously satisfy a high bending elastic modulus and a high shock resistance. As to the semi-aromatic polyamide, examples of the preferred ones are polyamide 6T/6I prepared from terephthalic acid, isophthalic acid and adipic acid as materials, polyamide 6T/66 prepared from terephthalic acid, adipic acid and hexamethylenediamine as materials.

A compounding rate of the amorphous polyamide resin (B) is 2 to 20 parts by mass and preferably 10 to 15 parts by mass when a total amount of the ingredients (A) and (B) and the ingredients (C) to (F) in the glass-fiber-reinforced polyamide resin composition of the present invention is taken as 100 parts by mass. When the compounding rate of the amorphous polyamide resin (B) is less than the above range, there is a tendency that an appearance of a molded product becomes bad. On the contrary, when it is more than the above range, there is a tendency that a releasing from a metal mold becomes poor or the appearance of the molded product becomes bad.

The compounding rate of the crystalline aliphatic polyamide resin (A) to the amorphous polyamide resin (B) in terms of mass ratio is preferred to be from 60:40 to 95:5 and more preferred to be from 60:40 to 90:10 so as to express a high elastic modulus, so as to adjust a velocity of solidification, and so as to improve a strand property upon a production and a metal mold transfer upon an injection molding.

As result of compounding the crystalline aliphatic polyamide resin (A) with the amorphous polyamide resin (B) as mentioned above, an effect of improving the weather resistance becomes high. The reason therefor is presumed to be due to changes in a dispersing property and a compatibility of the acrylic resin (C).

As to the acrylic resin (C), there are exemplified a homopolymer and a copolymer of methacrylate. It is preferred that the copolymer contains 50% by mass or more of methacrylate. It is more preferred that the copolymer contains 70% by mass or more of methacrylate. As to the methacrylate monomer, specific examples thereof are alkyl methacrylate (such as methyl methacrylate, ethyl methacrylate, propyl methacrylate and butyl methacrylate) and a derivative of alkyl methacrylate wherein hydrogen of an alkyl group is substitute with hydroxyl group, amino group, etc. (such as β-hydroxyethyl methacrylate and N,N-dimethylaminoethyl methacrylate). As to a monomer which is copolymerizable to the methacrylate monomer, there are exemplified vinyl monomers such as methyl acrylate, styrene, α-methylstyrene and acrylonitrile. Particularly preferred ones among the acrylic resin (C) as such are methyl polymethacrylate and ethyl polymethacrylate.

With regard to a melt fluidity of the acrylic resin (C), a melt flow rate (MFR) under a condition of 230° C. and 37.3 N is preferred to be 5 or more and more preferred to be 15 or more.

A compounding rate of the acrylic resin (C) is 1 to 10 parts by mass, preferably 1 to 7 parts by mass, more preferably 2 to 7 parts by mass, and further preferably 3 to 7 parts by mass when a total amount of the ingredients (A) to (C) and the ingredients (D) to (F) in the glass-fiber-reinforced polyamide resin composition of the present invention is taken as 100 parts by mass. When the compounding rate of the acrylic resin (C) is less than the above range, there is a tendency that a specification of the weather resistance is not satisfied while, when it is more than the above range, there is a tendency that an appearance is not good due to a poor release and an insufficient fluidity whereby a strength specification of a molded product is not satisfied.

In the glass-fiber-reinforced polyamide resin composition of the present invention, it is preferred that the compounding rate of the acrylic resin (C) to a total amount (100 parts by mass) of the polyamide resins (A) and (B) is 2 to 30 parts by mass. When the compounding rate of the acrylic resin (C) is less than the above range, there is a tendency that an effect of improving the weather resistance becomes small. On the other hand, when it is more than the above range, there is a tendency that a strength, a rigidity, a resistance to solvents and a heat resistance largely decrease.

As to the mica (D), there are exemplified white mica, gold mica, black mica and artificial mica. Any of them may be used. It is preferred that when a shape of mica is approximated to an elliptic shape and a mean value of a long diameter and a short diameter is defined as a particle size, the particle size of mica is about 1 to 30 μm in view of a balance between an appearance and a rigidity.

A compounding rate of the mica (D) is 2 to 25 parts by mass and preferably 15 to 22 parts by mass when a total amount of the ingredients (A) to (D) and the ingredients (E) and (F) in the glass-fiber-reinforced polyamide resin composition of the present invention is taken as 100 parts by mass. When the compounding rate of the mica (D) is less than the above range, there is a tendency that an effect of improving the appearance of molded product becomes small. On the other hand, when it is more than the above range, there is a tendency that a fluidity and a mechanical strength become inferior.

A cross section of the glass fiber (E) may be either circular or flat. Glass fiber having a flat cross section includes a one wherein a cross section being vertical to a lengthwise direction of the fiber is nearly elliptic, nearly long circular or nearly cocoon shape, and a flatness degree thereof is preferably 1.5 to 8 and more preferably 2 to 5. Here, the term "flatness degree" is a ratio of a long diameter to a short diameter when a rectangle with the smallest area contacting an outside of the cross section vertical to the lengthwise direction of the glass fiber is supposed and a length of a long side of this rectangle is named the long diameter and a length of a short side thereof is named the short diameter. When the flatness degree is less than the above range, there is no big difference in terms of a shape from glass fiber having a circular cross section and, therefore, there are some cases wherein an impact resistance of the molding product is not so much enhanced. On the other hand, when the flatness degree is more than the above range, a bulk density in the polyamide resin is high and, therefore, there are some cases wherein the glass fiber cannot be uniformly dispersed in the polyamide and there are also some cases wherein an impact resistance of the molded product is not so much enhanced. In the present invention, when the glass fiber has the nearly long circular cross section and has the flatness degree of 2 to 5, it is possible to express a higher mechanical property.

A compounding rate of the glass fiber (E) is 20 to 50 parts by mass and preferably 25 to 45 parts by mass when a total amount of the ingredients (A) to (E) and the ingredient (F) in the glass-fiber-reinforced polyamide resin composition of the present invention is taken as 100 parts by mass. When the compounding rate of the glass fiber (E) is less than the above range, there is a tendency that a rigidity of the molded product becomes insufficient. On the other hand, when it is more than the above range, there is a tendency that a reinforcing effect is not achieved in proportion to the compounded amount.

In preparing a glass-fiber-reinforced polyamide resin composition according to the present invention, it is preferred that a polyamide-reactive silane coupling agent is added in an amount of 0.1 to 1.0% by mass of the glass fiber (E), particularly when the glass fiber has a flat cross section. As to a converging agent for a chopped strand for the polyamide, a small amount of a silane coupling agent is previously contained in a fiber bundle in order to improve an adhesive property to a matrix resin. However, there is an upper limit for an amount of the amino silane coupling agent which can be previously added to the fiber bundle so as to avoid a poor opening of the fiber bundle during an extrusion. Therefore, it is preferred to further add a shortfall separately.

As to the carbon black (F), there is no particular limitation therefor. There are exemplified thermal black, channel black, acetylene black, Ketjen black and furnace black. As to the carbon black (F), a preferred one is that wherein an average particle size is within a range of from 10 to 40 μm, a specific surface by means of a BET adsorption method is within a range of from 50 to 300 m$^2$/g and an oil absorbing amount when dibutyl phthalate is used is within a range of from 50 cc/100 g to 150 cc/100 g.

It is preferred in view of a workability that the carbon black (F) is compounded as a master batch which contains polyethylene resin or polystyrene resin as a base resin. As to the base resin, there are exemplified various kinds of polyethylene represented by low-density polyethylene (LDPE), high-density polyethylene (HDPE), ultrahigh-molecular weight polyethylene (UHMWPE), etc. and, in addition, a polyethylene resin such as a copolymer of ethylene with α-olefin (e.g., a random copolymer and a block copolymer of ethylene with propylene and a random copolymer and a block copolymer of ethylene with butene), a copolymer of ethylene with unsaturated carboxylate (e.g., ethylene-methacrylate and ethylene-butyl acrylate) and a copolymer of ethylene with aliphatic vinyl compound (e.g., ethylene with vinyl acetate); as well as a homopolymer (e.g., polystyrene, poly(α-methylstyrene) and poly(p-methylstyrene)), a copolymer of styrene with acrylonitrile (AS resin) and a copolymer of styrene monomer with maleimide monomer (e.g. maleimide or N-phenylmaleimide) or with acrylamide monomer (e.g., acrylamide).

A compounding rate of the carbon black (F) is 0.1 to 5 parts by mass, preferably 0.2 to 4.5 parts by mass, more preferably 0.2 to 3.5 parts by mass, and further preferably 0.2 to 3 parts by mass when a total amount of the ingredients (A) to (F) in the glass-fiber-reinforced polyamide resin composition of the present invention is taken as 100 parts by mass. When the compounding rate of the carbon black (F) is less than the above range, there is a tendency that a contribution to the whether resistance becomes small. On the other hand, when it is more than the above range, there is a tendency that a mechanical strength and a rigidity are deteriorated.

As to the copper compound (G), examples are copper chloride, copper bromide, copper iodide, copper acetate, copper acetylacetonate, copper carbonate, copper borofluoride, copper citrate, copper hydroxide, copper nitrate, copper sulfate and copper oxalate. In the glass-fiber-reinforced polyamide resin composition of the present invention, a content of the copper compound (G) is 0.005 to 1.0 part by mass and preferably 0.01 to 0.5 part by mass when a total amount of the ingredients (A) to (F) in the glass-fiber-reinforced polyamide resin composition of the present invention is taken as 100 parts by mass. When the content of the copper compound (G) is less than the above range, there is a tendency that a resistance to thermal deterioration is inferior. On the other hand, even when it is more than the above range, no more improvement in the resistance to thermal deterioration is noted but there is a tendency that physical properties lower.

It is also possible in the present invention to add an alkali halide compound as a stabilizer in a manner of joint use with the copper compound. Examples of such an alkali halide compound are lithium bromide, lithium iodide, potassium bromide, potassium iodide, sodium bromide and sodium iodide. A particularly preferred one is potassium iodide.

Moreover, in the glass-fiber-reinforced polyamide resin composition according to the present invention, in addition to the above essential ingredients (A) to (G), it is possible to add an optional ingredient such as a fibrous reinforcement material, an inorganic filler, a phenol-type antioxidant and a phosphorus-type antioxidant as a stabilizer to light or heat, a mold-releasing agent, a crystal nucleus agent, a lubricant, a flame retardant, an antistatic agent, a pigment, a dye, etc. within such an extent that it does not deteriorate the characteristic feature of the present invention. In the glass-fiber-reinforced polyamide resin composition of the present invention, a total amount of the optional ingredients other than the essential ingredients (A) to (G) is preferred to be 10% by mass in maximum. Further, in view of a whether resistance, it is preferred that a content of wollastonite is 5 parts by mass or less when a total amount of the ingredients (A) to (F) in the glass-fiber-reinforced polyamide resin composition of the present invention is taken as 100 parts by mass. It is more preferred that no wollastonite is contained therein.

There is no particular limitation for a method of producing the glass-fiber-reinforced polyamide resin composition of the present invention. Each of the ingredients may be melted and kneaded by a known kneading method to give the composition. There is also no limitation for a specific kneading apparatus. Although an uniaxial or biaxial extruder, a kneading machine, a kneader, etc. may be exemplified, the biaxial extruder is particularly preferred in view of a productivity. Although there is also no particular limitation for a screw arrangement, it is preferred to provide a kneading zone so that each of the ingredients is more uniformly dispersed. As to a specific method therefor, there is exemplified a method wherein a mixture of the polyamide resins (A) and (B) and the acrylic resin (C) is preblended together with the copper compound (G) and with other ingredients using a blender and poured into a uniaxial or biaxial extruder from a hopper; then the mica (D) and the glass fiber (E) are poured into a melted mixture in the uniaxial or biaxial kneader using a feeder under a state wherein at least a part of the polyamide resins (A) and (B), and the acrylic resin (C) are melted and; after the melting and kneading thereof, it is blown out into a strand form followed by cooling and cutting.

Since the glass-fiber-reinforced polyamide resin composition of the present invention is prepared according to the above-mentioned compounding rate, it is characterized in having an excellent weather resistance as shown below.

Thus, a color difference ΔE before and after the weathering test (according to JIS K-7350-2) using a xenon weatherometer is 3.5 or less, preferably 2.5 or less, and more preferably 2.0 or less. Details of the weathering test are in accordance with a procedure given in the Examples which will be mentioned later. Due to a fact that the color difference ΔE is the above value or less, it is now possible to resist an outdoor use being exposed to rainfall.

EXAMPLES

The present invention will now be illustrated in more detail as hereunder by Examples. However, the present invention is not limited to the following Examples so far as it does not exceed a gist thereof. Measurement of physical data in the Examples was carried out in accordance with the following methods.

(1) Relative Viscosity of Polyamide Resin:
A polyamide resin (0.25 g) was dissolved in 25 ml of 96 wt % sulfuric acid, and 10 ml of a resulting solution was placed in an Oswald viscometer. A measurement was conducted at 20° C. Relative viscosity was calculated according to the following formula.

$$RV = T/T0$$

RV: Relative viscosity, T: Dropping time of a sample solution, T0: Dropping time of a solvent (2) Bending Strength and Bending Elastic Modulus:
Bending strength and bending elastic modulus were measured in accordance with ISO 178.

(3) Evaluation of Weather Resistance
Color difference ΔE: A wrinkled flat plate (100 mm×100 mm×2 mm) molded by an injection molding machine (IS 80 manufactured by Toshiba Machinery) adopting a cylinder temperature of 280° C. and a metal mold temperature of 90° C. was subjected to a weathering test in accordance with JIS K 7350-2 using a xenon weatherometer (XL 75 manufactured by Suga Shikenki KK) under the following conditions:
black panel temperature: 63±2° C.
relative humidity: 50±5%
irradiation method: rainfall for 18 minutes during 120 minutes (being sprinkled with water)
irradiation time: 1250 hours
irradiation degree: 60 W/m$^2$.S with 300 to 400 nm wavelength optical filters: quartz (inside) and borosilicate #275 (outside).

For the wrinkled flat plate before and after the weathering test, value of "L", "a" and "b" were measured using TC-1500 SX (spectrophotometer manufactured by Tokyo Denshoku) whereupon the color difference ΔE was calculated.

Surface Appearance of the Molded Product after the Exposure Test (to Check Whether a Reinforcement Material was Lifted):
○: No lifting of the reinforcement material was noted.
x: Lifting of the reinforcement material was noted.
State of Wrinkles on the Surface of the Molded Product after the Exposure Test:
○: Wrinkled pattern was clearly noted.
x: Winkled pattern could not be confirmed.
Polyamide Resin (A):
(A1) Polyamide 6 having a relative viscosity RV of 1.9; "Nylon T-860" manufactured by Toyobo
(A2) Polyamide 66 having a relative viscosity RV of 2.4; "Stabamide 23ΔE" manufactured by Rhodia
Amorphous Polyamide Resin (B)
(B1) Polyamide 6T6I having a relative viscosity RV of 2.0; "Glyboly G21" manufactured by Ems
(B2) Polyamide 6T6I having a relative viscosity RV of 1.8; "Glyboly G16" manufactured by Ems
Acrylic Resin (C)
Poly(methyl methacrylate) "Parapet GF" manufactured by Kuraray
Mica (D)
"S-325" manufactured by Repco
Glass Fiber (E)
"T-275H" manufactured by Nippon Electric Glass Co., Ltd. (a chopped strand of glass fiber having a circular cross section: diameter 11 μm)
Carbon Black (F)
Master batch: "EPC-840" manufactured by SUMIKA COLOR CO., LTD., base resin LDPE resin, containing 43% by weight of carbon black
Copper Compound (G)
Cupric bromide: Manufactured by Wako Pure Chemicals; purity: 99.9%

Other Ingredients Used:
Wollastonite: "NYGLOS 8" manufactured by Nyco Minerals (fiber diameter: 8 μm; fiber length: 136 μm)
Light stabilizer: Nylostab S-eed (manufactured by Clariant)

Examples 1 to 9 and Comparative Examples 1 to 9

Ingredients other than the mica (D), the glass fiber (E), and the wollastonite were subjected to a dry blending under compounding ratios as shown in Tables 1 and 2 and subjected to a melt mixing under an extruding condition wherein a cylinder temperature was 280° C. and a screw revolution was 250 rpm using a biaxial extruder "STS 35 mm" manufactured by Coperion which was a biaxial extruder of a bent type constituted from 12 blocks of barrel. After that, the mica (D), the glass fiber (E), and the wollastonite were fed by a side feeding method to conduct a melt kneading. Strand extruded from the extruder was quickly cooled and made into pellets using a strand cutter. The resulting pellets were dried at 100° C. for 12 hours, then molded into a wrinkled flat plate using an injection molding machine (IS 80 manufactured by Toshiba Machine Co., Ltd.) at a cylinder temperature of 280° C. and a metal mold temperature of 90° C. The resulting test pieces were subjected to evaluations. Results of the evaluations are also mentioned in Tables 1 and 2. In Tables 1 and 2, a compounding amount of carbon black master batch (F) is an amount as a master batch.

TABLE 1

|  |  | Examples |  |  |  |  |  |  |  |  |
|---|---|---|---|---|---|---|---|---|---|---|
|  |  | 1 | 2 | 3 | 4 | 5 | 6 | 7 | 8 | 9 |
| Compounding rate of composition (part(s) by mass) | polyamide 6 (A1) | 23.5 | 21.5 | 24 |  | 26.5 | 23.5 | 23.5 | 23.5 | 23.5 |
|  | polyamide 66 (A2) |  |  |  | 23.5 |  |  |  |  |  |
|  | amorphous polyamide (B1) | 14.5 | 14.5 | 14.5 |  | 11.5 |  | 14.5 | 14.5 | 14.5 |
|  | amorphous polyamide (B2) |  |  |  | 14.5 |  | 14.5 |  |  |  |
|  | acrylic resin (C) | 4 | 6 | 2 | 4 | 4 | 4 | 4 | 4 | 4 |
|  | mica (D) | 20 | 20 | 20 | 20 | 20 | 20 | 16 | 20 | 20 |
|  | wollastonite |  |  |  |  |  |  |  |  |  |
|  | glass fiber (E) | 35 | 35 | 35 | 35 | 35 | 35 | 41 | 35 | 35 |
|  | carbon black master batch (F) | 3 | 3 | 4.5 | 3 | 3 | 3 | 1 | 3 | 3 |
|  | copper bromide (G) | 0.02 | 0.02 | 0.02 | 0.02 | 0.02 | 0.02 | 0.02 | 0.1 | 0.3 |
|  | light stabilizer |  |  |  |  |  |  |  |  |  |
| Characteristics of composition | bending strength (MPa) | 280 | 280 | 280 | 280 | 280 | 280 | 290 | 280 | 280 |
|  | bending elastic modulus (GPa) | 18 | 18 | 18 | 18 | 18 | 18 | 19 | 18 | 18 |
|  | weather resistance — color difference ΔE | 2.2 | 1.2 | 3.1 | 2.2 | 2.2 | 2.2 | 3.3 | 2.2 | 2.2 |
|  | weather resistance — lifting of reinforcement material | ○ | ○ | ○ | ○ | ○ | ○ | ○ | ○ | ○ |
|  | weather resistance — state of wrinkles after the test | ○ | ○ | ○ | ○ | ○ | ○ | ○ | ○ | ○ |

TABLE 2

|  |  | Comparative Examples |  |  |  |  |  |  |  |  |
|---|---|---|---|---|---|---|---|---|---|---|
|  |  | 1 | 2 | 3 | 4 | 5 | 6 | 7 | 8 | 9 |
| Compounding rate of composition (part(s) by mass) | polyamide 6 (A1) | 42 | 38 | 27.5 | 25.5 | 25.5 | 18 | 25.5 | 23.5 | 23.5 |
|  | polyamide 66 (A2) |  |  |  |  |  |  |  |  |  |
|  | amorphous polyamide (B1) |  |  | 14.5 | 14.5 | 30 | 4.5 | 16.5 | 14.5 | 14.5 |
|  | amorphous polyamide (B2) |  |  |  |  |  |  |  |  |  |
|  | acrylic resin (C) |  | 2 |  | 2 | 1 | 2 |  | 4 | 4 |
|  | mica (D) | 20 | 4 |  | 4 | 7 | 35 | 20 |  | 55 |
|  | wollastonite |  |  | 16 | 20 | 16 |  |  |  |  |
|  | glass fiber (E) | 35 | 35 | 35 | 35 | 35 | 35 | 35 | 55 |  |
|  | carbon black master batch (F) | 3 | 3 | 3 | 3 | 3 | 3 | 3 | 3 | 3 |
|  | copper bromide (G) |  | 0.02 | 0.02 |  | 0.02 | 0.02 | 0.02 | 0.02 | 0.02 |
|  | light stabilizer |  |  |  | 0.4 |  |  |  |  |  |
| Characteristics of composition | bending strength (MPa) | 280 | 280 | 280 | 280 | 230 | 310 | 280 | 330 | 190 |
|  | bending elastic modulus (GPa) | 18 | 18 | 18 | 18 | 9 | 21 | 18 | 19 | 9 |
|  | weather resistance — color difference ΔE | 4.7 | 5.0 | 4.8 | 4.9 | 4.4 | 4.1 | 4.8 | 2.2 | 2.2 |
|  | weather resistance — lifting of reinforcement material | x | x | ○ | ○ | x | x | ○ | x | ○ |
|  | weather resistance — state of wrinkles after the test | x | x | x | x | x | x | x | x | ○ |

From Table 1, it is noted that, in the test pieces of Examples 1 to 9, the color difference ΔE before and after the exposure test is small. This will mean that a fading of black color is suppressed. It is also noted that the lifting of the glass fiber is suppressed and the state of the wrinkles is good as well. On the contrary, from Table 2, it is noted that, in the test pieces of Comparative Examples 1 to 7, the color difference ΔE before and after the exposure test is big. This will mean that a fading of black color is big. It is also noted that the wrinkled appearance is deteriorated. From Table 2, it is noted that, in the test piece of Comparative Example 8, although the color difference ΔE is good in both, the test piece is inferior in terms of weather resistance. From Table 2, it is noted that, in the test piece of Comparative Example 9, although the color difference ΔE is good in both, the test piece is inferior in terms of bending strength and bending elastic modulus.

INDUSTRIAL APPLICABILITY

The glass-fiber-reinforced polyamide resin composition of the present-invention is suitably used for vehicle interior or vehicle exterior such as an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

The invention claimed is:

1. A glass-fiber-reinforced polyamide resin composition, comprising a crystalline aliphatic polyamide resin (A), an amorphous polyamide resin (B), poly(methyl methacrylate) (C), mica (D), glass fiber (E) and a carbon black master batch (F) in a ratio by mass of (20 to 30):(10 to 15):(2 to 6):(15 to 22):(25 to 45):(1 to 4.5), respectively, and further comprising a copper compound (G) in a ratio of 0.005 to 1.0 part by mass when a total amount of the ingredients (A) to (F) is taken as 100 parts by mass,
wherein, when a flat plate is prepared by subjecting the glass-fiber-reinforced polyamide resin composition to an injection molding and the resulting plate is subjected to a weathering test in accordance with JIS K 7350-2, a color difference ΔE before and after the weathering test is 3.5 or less.

2. The glass-fiber-reinforced polyamide resin composition according to claim 1, wherein the amorphous polyamide resin (B) is a semi-aromatic polyamide.

3. The glass-fiber-reinforced polyamide resin composition according to claim 1, comprising the crystalline aliphatic polyamide resin (A), the amorphous polyamide resin (B), the poly(methyl methacrylate) (C), the mica (D), the glass fiber (E) and the carbon black master batch (F) in a ratio by mass of (21.5 to 24):(11.5 to 14.5):(2 to 6):(16 to 20):(35 to 41):(1 to 4.5), respectively, and further comprising the copper compound (G) in a ratio of 0.02 to 0.3 part by mass when the total amount of the ingredients (A) to (F) is taken as 100 parts by mass, and
wherein the color difference ΔE before and after the weathering test is 3.3 or less.

4. A molded product for vehicle interior or vehicle exterior, wherein the molded product is molded from the glass-fiber-reinforced polyamide resin composition according to claim 1.

5. The molded product for vehicle interior or vehicle exterior according to claim 4, wherein the product is selected from the group consisting of an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

* * * * *